United States Patent
Curtiss et al.

(10) Patent No.: US 6,758,664 B1
(45) Date of Patent: Jul. 6, 2004

(54) SELF-LEVELING STAMPER MODULE

(75) Inventors: Donald Everett Curtiss, Los Gatos, CA (US); Koichi Wago, Sunnyvale, CA (US); Joseph Leigh, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 85 days.

(21) Appl. No.: 10/042,168

(22) Filed: Jan. 11, 2002

Related U.S. Application Data

(60) Provisional application No. 60/261,678, filed on Jan. 12, 2001.

(51) Int. Cl.[7] ............................................. B29D 11/00
(52) U.S. Cl. ........................ 425/193; 425/406; 425/810; 100/258 A
(58) Field of Search ................................ 425/193, 406, 425/408, 810; 100/258 R, 258 A

(56) References Cited

U.S. PATENT DOCUMENTS 5,272,904 A * 12/1993 Krumholz .................... 72/455
6,165,391 A * 12/2000 Vedamuttu .................. 264/1.33
2003/0091781 A1 * 5/2003 Arakawa et al. ........... 428/64.4

FOREIGN PATENT DOCUMENTS

JP   2002-230852   *   8/2002

* cited by examiner

Primary Examiner—James P. Mackey
Assistant Examiner—Donald Heckenberg
(74) Attorney, Agent, or Firm—McDermott, Will & Emery

(57) ABSTRACT

In a disk replicating assembly, a blank disk is attached to one platen and a stamper is attached to the other platen. Pressure is applied so that the two platens are forced together, thereby transferring features from the stamper to the disk. A ball joint is located between a platen and the pressure train of the replicating assembly. Due to the ball joint at this location, the resulting pressure gradient when the stamper and disk are pressed together causes the one platen to swivel such that it orients itself substantially parallel to the other platen. Because the resistance of the ball joint is selected so that the one platen is able to pivot before the stamper significantly affects the disk, the fine features of the stamper are not transferred to the disk until the platens are in parallel alignment.

9 Claims, 2 Drawing Sheets

SELF-LEVELING STAMPER MODULE

RELATED APPLICATION

The present application claims the benefit of U.S. Provisional Patent Application Ser. No. 60/261,678 entitled, SELF-PLANARIZING MODULE filed on Jan. 12, 2001 by Donald Curtiss et al., the contents of which are incorporated by reference in their entirety.

FIELD OF THE INVENTION

The present invention relates to optical data storage disks and, more particularly, to replicating such data storage disks.

BACKGROUND OF THE INVENTION

Data storage disks are typically produced using a disk replication process. A master disk is made having a desired surface relief pattern formed therein. The surface relief pattern is typically created using an exposure step (e.g., by laser recording) and a subsequent development step. The master disk is used to make a stamper, which in turn is used to stamp out replicas in the form of replica disk substrates as part of a disk molding or stamping process. As such, the surface relief pattern, information and precision of a single master can be transferred into many inexpensive replica disk substrates.

Conventional mold assemblies, although usually referred to as "stampers" for historical reasons, typically include a fixed side and a moving side. The stamper portion is typically attached to the moving side for replicating a desired surface relief pattern (i.e., lands, grooves and/or pits) into the replica disk substrate. A movable gate cut may be provided for cutting a central opening in the replica disk substrates. The stamper is usually secured to the moving side using an inner holder, wherein the inner holder fits over the stamper. Several more tooling parts may be located at the center of the mold assembly.

In one conventional process, during the disk molding process, a resin, typically optical grade polycarbonate, is forced in through a channel into a substrate cavity within the mold assembly to form the replica disk substrate. The surface relief pattern or formatted surface is replicated in the replica disk substrate by the stamper as the cavity is filled. After filling, the gate cut is brought forward to cut a center hole in the replica disk substrate. After the replica disk has sufficiently cooled, the mold assembly is opened and the gate cut and a product eject may be brought forward for ejecting the formatted replica disk substrate off of the stamper. The inner holder may be removable to allow changeout of the stamper.

In another conventional process, a disk is coated with a relatively thin polymer layer into which the fine details are stamped. The starting composition is not molten plastic, but can be an element comprising a very thin embossable radiation-reflective layer overlying an embossable, heat-softenable layer which can be simply thermoplastic or can also be radiation-curable. Optionally, the heat-softenable composition can be coated on a substrate. Impressing the stamper information into the heat-softenable layer can be done with a platen or roll embosser. Radiation curing helps retain the desired relief shape by crosslinking. Disks are provided with a reflective layer either before or after they are impressed with the information-carrying relief pattern.

A significant disadvantage with both of the high pressure, high temperature relief-forming methods described above is the potential for image distortion and internal stresses in the disks produced. Regardless of the particular conventional process used, one shortcoming of the techniques employed in this field is the lack of parallelism between the two platens of the stamper. The parallelism, or lack thereof, affects the pressure gradient across various regions of the blank disk as well as the precision and accuracy with which the fine details are transferred to the blank disk. Methods for replicating disks have relied on precision manufacturing and assembly of the stamping equipment to provide the tolerances needed for accurate disk replication. These methods increase the complexity and costs of the stamping equipment as well as their maintenance, calibration and operation. Therefore, a need, unmet by the prior art, exists for a less expensive and less complex stamping machine which provides the precision needed to accurately replicate optical data storage disks.

SUMMARY OF THE INVENTION

These and other shortcomings of the prior art are addressed by a stamper assembly which incorporates a self-leveling mechanism into at least one of the stamper platens which acts to dynamically bring the two platens into a parallel relationship during the stamping operation. As a result, the yield of the replication process is increased due to increased accuracy, the manufacturing cost and complexity of stamping equipment are reduced, and the repair, maintenance and operating costs of the stamping equipment is reduced.

One aspect of embodiments of the present invention for addressing the needs unmet by the prior art relates to a stamper module for optical disk replicating equipment which includes a platen which can connect with a stamper and a platen which can connect with a disk. The stamper module also includes means that dynamically orient the first and second platen into a parallel orientation during the stamping operation.

Another aspect of embodiments of the present invention relates to a stamper module for optical disk replicating equipment which includes a first and second platen in which a ball joint is connected with the first platen. The ball joint operates such that when the first and second platen are performing a stamping operation, the ball joint swivels to orient the first platen and the second platen in parallel.

Yet a further aspect of embodiments of the present invention relates to a stamper module for optical disk replicating equipment which includes a first and second platen each having a surface opposing the other. In accordance with this aspect, the module also includes a ball joint attached to the first platen and a pressure train configured to bring the opposing surfaces towards one another during a stamping operation. The position of the ball joint allows the ball joint to swivel during the stamping operation so as to orient the opposing surface parallel to one another during stamping.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses needs previously unmet in the field of disk replication by providing a stamper assembly that incorporates a self-leveling mechanism into at least one of the stamper platens. The self-leveling mechanism acts to dynamically position the two platens of the assembly into a parallel relationship during the stamping operation.

Figure 1A:
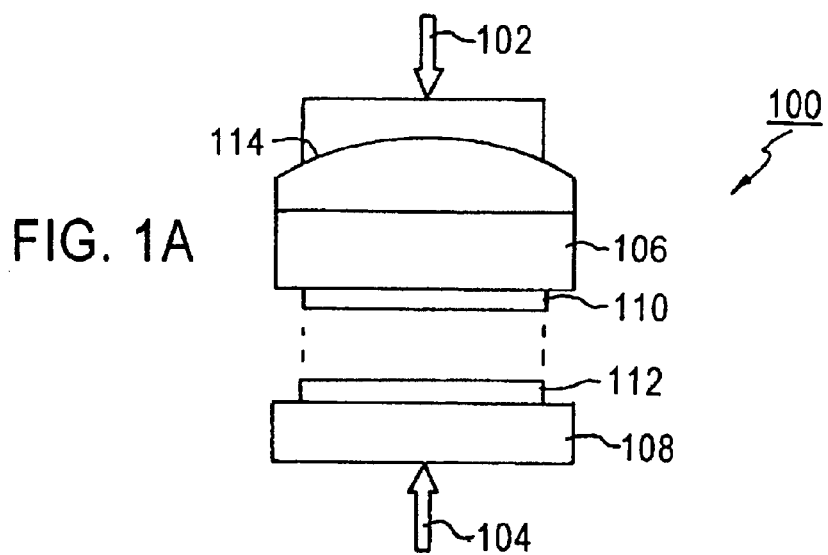
FIGS. 1A through 1C illustrate different operating positions of disk stamping equipment according to an embodiment of the present invention.
Figure 1B:
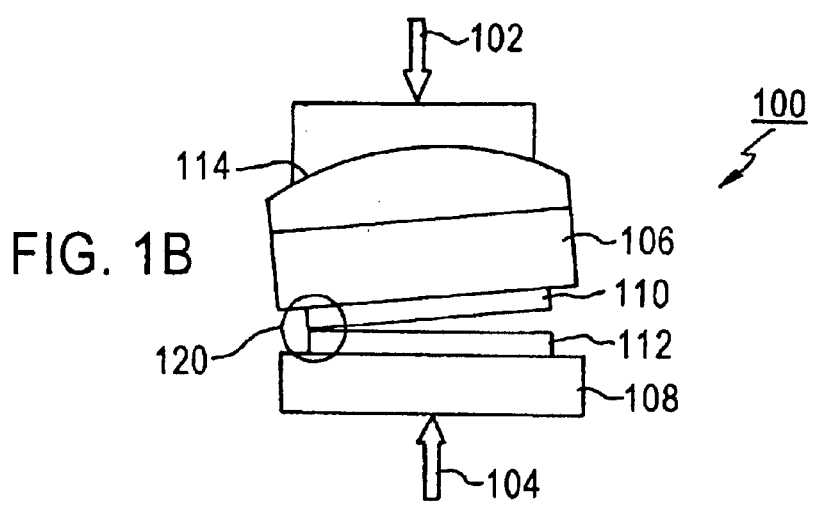
Figure 1C:
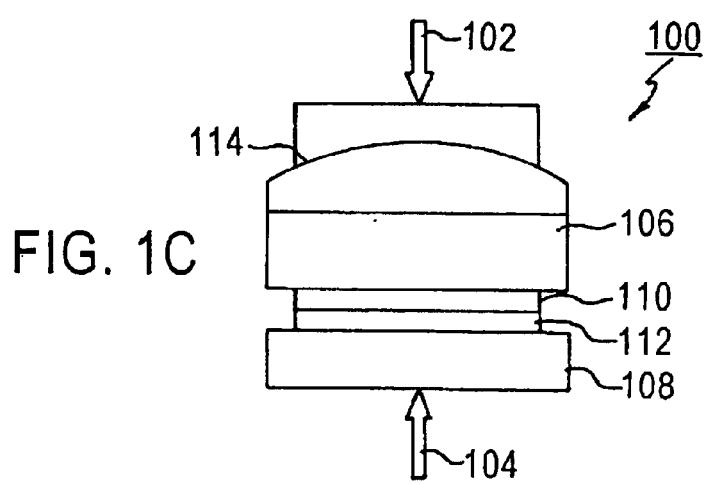

FIGS. 1A through 1C illustrate portions of an optical disk replicating stamper assembly 100 during different phases of operation. Other portions of the entire stamper assembly, which are well known in the art, are not depicted in the figures so as not to obscure the merits and features of the present invention. These undepicted portions of a disk replicator include the arrangements for applying pressure 102 and 104 to the two platens 106 and 108. Also, the stamper assembly 100 can also be enclosed in a vacuum chamber so that certain process steps, including the stamping, can be performed under vacuum.

In particular, FIG. 1A illustrates the assembly 100 in a preparatory state before the stamper 110 and disk 112 come into contact. FIG. 1B depicts the stamping operation as it is occurring while the two plates 106 and 108 are initially unparallel and FIG. 1C depicts the performing and completion of the stamping operation once the two platens 106 and 108 are positioned in a parallel arrangement.

Stamper 110 is formed according to conventional disk mastering techniques as are known in the art. According to these techniques, data to be encoded on a disk is arranged and formatted, according to the disk's eventual application, into a disk image. For example, a DVD disk might have encoded thereon MPEG-2 sequences along with surround sound audio data.

Mastering a disk typically begins with a 240 mm diameter, 5.9 mm thick glassy plate which is polished and washed. After photoresist is spin coated and baked on the glass, the mastering equipment modulates a laser according to the disk image in order to expose a pit and land pattern across the glass plate. The exposed plate is then developed and etched to create pits in the photoresist surface. The glass master is then vacuum coated with silver. The pit geometries are the fine features transferred to blank disks during replication. Pit geometry for DVD is usually less than 0.74 $\mu$m while a conventional CD-ROM's pit geometry is less than 1.6 $\mu$m, as these values represent the track pitch of these two optical disk formats.

The glass master is not robust enough for the stresses of the stamping process. Therefore, the silvered glass master is placed in a galvanized tank with a nickel electrolyte solution with the glass master connected to the cathode such that a relatively thick nickel layer is electroplated from the anode onto the glass master. The nickel layer, which forms the stamper 110, is then separated from the glass, cleaned, punched, trimmed, and used for replication of disks.

The disk 112 to be stamped is typically a rigid disk with a thin, deformable coating on top. In certain embodiments, the deformable coating is a polymer coating, such as polymethylmethacrylate from MicroChem Corp., and typically has a thickness in the range of 100 nm to 200 nm. However, other coating materials and thicknesses are expressly contemplated depending on the feature size and intended environment of the eventual stamped disk.

The coating is usually formed by spinning on a UV curable polymer over the surface of the disk 112 and then passing the coated disk under UV light to polymerize or cure the coating. After a stamper is pressed into the polymer layer, the disk 112 is vacuum coated with Aluminum, or similar material, to provide the reflectivity necessary for playback.

While specific embodiments described herein refer to particular compact disks in order to aid in the understanding of the present invention, the present stamper assembly is not limited to these specific embodiments. In particular, substantially clear plastic disks having thicknesses other than the standard 0.6 mm and 1.2 mm sizes are contemplated. Also, compact disks having a variety of data densities, encoding formats and storage capacities such as ISO-9660, CD-DA, CD-ROM, CD-I, CD-V and DVD, for example, can benefit from the stamper assembly 100.

Returning to FIG. 1A, the stamper assembly 100 also includes a top platen 106 and a bottom platen 108 oppositely arranged. Using any of the industry-recognized conventional methods, the stamper 110 is attached to a surface of the top platen 106 and the polymer coated disk 112 is attached to a surface of the bottom platen 108. Alternatively, the stamper 100 and disk 112 could be attached to the opposite platens as well. The pressure train of the replicating equipment applies pressure 102 and 104 to force the platens 106 and 108 together to perform a stamping operation (see FIG. 1B). Typical stamping pressures for most compact disks are between 5–15 Mpa and preferably at least 10 Mpa. Depending on the disk material and polymer coating characteristics, other pressure ranges can be utilized.

In one embodiment, the platens 106 and 108 are constructed from a sturdy metal, such as stainless steel, and are 15"×15"×2'. However, this platen size is dependent on, and can be adjusted for, the disk size such that the platens 106 and 108 are large enough to securely support the stamper 110 and the disk 112.

In certain preferred embodiments, the bottom platen 108 moves vertically due to pressure 104 in order to press the disk 112 against the stamper 110 which is attached to a stationary top platen 106. Alternatively, the top platen 106 could move while the bottom platen 108 remains stationary; also, both platens 106 and 108 can be allowed to move together simultaneously or sequentially. Any combination which causes the work pieces to contact to produce a desired pressure (e.g., 10 Mpa) is expressly contemplated.

As with conventional stamping operations and equipment, applying pressure along the center of the platen in motion (e.g., 108) produces a more even distribution of pressure across the work pieces; therefore, a ball joint 114 is preferably, but not necessarily, located centrally with respect to the appropriate platen. In particular, FIGS. 1A through 1C each depict the ball joint 114 attached to the top platen 106. Alternative embodiments include attaching the ball joint to the bottom platen 108.

Figure 2:
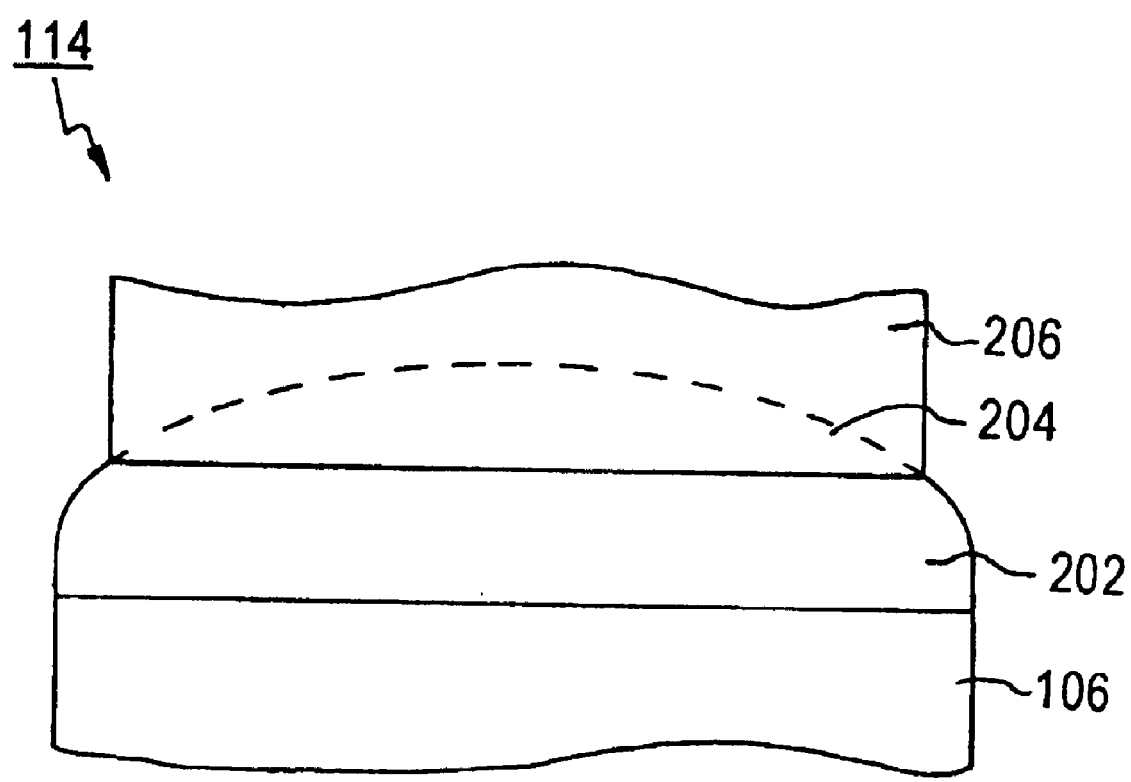
FIG. 2 illustrates an exemplary ball joint in accordance with an embodiment of the present invention

The ball joint 114, as shown in more detail in FIG. 2, includes a first section 202 having a spherical part 204 (i.e., a ball portion) that is partially surrounded by a second section 206 (i.e., a socket portion). Although the surface of the spherical part 204 and the inside surface of the second section 206 are in substantial contact with one another, the sections are not fixably connected but, instead, are free to swivel relative to one another. As recognized in the art, ball joints can include locking mechanisms which are used to adjust the amount of pressure that must be applied before the two sections will move relative to one another.

In certain embodiments, the ball joint 114 is constructed of stainless steel and includes a ball and socket with a radius of approximately 20 inches polished smooth with 1.5 micron diamond paste to a mirror finish. Other radius balls can be used but should be designed to withstand the expected pressures of the stamping operation.

Although not distinguishable in FIG. 1A, the opposing surfaces of top 106 and bottom 108 platens are not precisely parallel to one another. As previously discussed, the conventional approaches tried to manufacture the replication equipment with exact mechanical tolerances to provide rigid platens that were in precise parallel arrangement. The present stamper assembly 100 does not require such exacting tolerances regarding the parallel arrangement of the platens 106 and 108. If the platens 106 and 108 remained out of parallel during the stamping process then the features of the stamper 110 would not be accurately transferred to the disk 112. This is because the pressure exerted by the stamper 110 on the disk 112 will not be uniform across the entire surface of the disk 112. The ball joint 114, however, ensures that platens 106 and 108 are parallel during stamping.

As shown in FIG. 1B, pressure 102 and 104 is applied so that opposing platens 106 and 108 are brought together. As the stamper 110 contacts the disk 112 in an unparallel orientation, the disk 112 and the stamper 110 contact each other within region 120 but do not contact each other outside the region 120. As more pressure is applied, the top platen surface in contact with the attached stamper 110 experiences a pressure gradient which is transmitted (due to the rigid nature of the platen) to the attached ball joint 114. The tension of the ball joint 114 can be adjusted so that the ball and socket swivel at a pressure which is less than the pressure at which the stamper 110 significantly affects the polymer coating on the disk 112. As a result, the ball joint 114 dynamically adjusts to the pressure gradient during a stamping operation by swiveling to compensate for the lack of parallel between the two platens 106 and 108.

As seen in FIG. 1C, the swiveling ball joint 114, thus, acts as a self-leveling mechanism to bring the top 106 and bottom 108 platens in parallel during the disk replication process. Once the platens 106 and 108 are in parallel, as seen in FIG. 1C, the pressure 102 and 104 is increased to where the disk 112 is accurately stamped and, furthermore, the platens 106 and 108 remain in parallel throughout the stamping operation due to the self-leveling action of the ball joint 114. As a result, the yield of the replication process is increased due to increased accuracy, the manufacturing cost and complexity of stamping equipment are reduced, and the repair, maintenance and operating costs of the stamping equipment is reduced.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A stamper module for data recording disk replicating equipment, comprising:

a first platen having a first surface;

a second platen having a second surface, the first and second surfaces arranged opposed to one another;

a ball joint connected with the first platen at a portion opposite the first surface;

a pressure train configured to bring the first and second surfaces towards one another during a stamping operation;

wherein the ball joint swivels during a stamping operation to orient the first and second surfaces parallel to one another; and wherein the ball joint comprises a ball having a radius of approximately 20 inches.

2. A stamper module for data recording disk replicating equipment, comprising:

a first platen having a first surface;

a second platen having a second surface, the first and second surfaces arranged opposed to one another;

a ball joint connected with the first platen at a portion opposite the first surface;

a pressure train configured to bring the first and second surfaces towards one another during a stamping operation;

wherein the ball joint swivels during a stamping operation to orient the first and second surfaces parallel to one another; and wherein the ball joint includes an adjustable tension setting.

3. The stamper module in accordance with claim 2, wherein the first platen is configured for attaching a stamper.

4. The stamper module in accordance with claim 2, wherein the second platen is configured for attaching a disk.

5. The stamper module in accordance with claim 2, wherein the pressure train is configured to produce a pressure between 5–15 Mpa during a stamping operation.

6. The stamper module assembly in accordance with claim 2, wherein the pressure train is configured to move the second platen toward a stationary first platen.

7. The stamper module in accordance with claim 2, wherein the disk replicating equipment is configured to replicate disks formatted in one of DVD, CD-ROM, ISO-9660, CD-DA, CD-I and CD-V.

8. The stamper module in accordance with claim 2, wherein the adjustable tension setting of the ball joint permits the swiveling to occur prior to completion of the stamping operation.

9. The stamper module in accordance with claim 2, wherein the ball joint is centrally located with respect to the first platen.

* * * * *